Patented Jan. 6, 1953

2,624,720

UNITED STATES PATENT OFFICE 2,624,720

SILICON-CONTAINING ALKYD RESINS

David B. Hatcher and Raymond H. Bunnell, Toledo, Ohio, assignors to Libbey-Owens-Ford Glass Company, Toledo, Ohio, a corporation of Ohio No Drawing. Application February 23, 1949, Serial No. 77,996

10 Claims. (Cl. 260—45.4)

The invention relates to novel silicon-containing alkyd resins having cured characteristics substantially improved over those of the heretofore known alkyd resins.

Alkyd resins are extremely valuable commercial products, providing some of the most useful coating compositions that are generally available. However, unmodified alkyd resins are comparatively soft and lack alkali and water resistance (including resistance to soap solutions and to high humidity atmospheres); such resins also deteriorate rapidly when subjected to outdoor weather and have poor color characteristics. Consequently, commercial alkyd resins are usually modified, frequently with a urea-formaldehyde condensation product.

The principal object of the invention is to provide novel silicon-containing alkyd resins that are harder than known alkyd resins, resist alkaline solutions, water and outdoor weathering conditions better than known alkyd resins, and are improved in color over known alkyd resins. More specific objects and advantages are apparent from the description, which illustrates and discloses but is not intended to limit the scope of the invention.

It has been suggested that alkyd resins can be modified with silicon tetrachloride. Such a modification results in serious disadvantages; HCl is liberated by the reaction which takes place between the alkyd resin and the silicon tetrachloride, and the bonds (thought to be

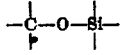

linkages) attaching the silicon atoms to the alkyd resin molecules are readily hydrolyzable, so that the water resistance of the alkyd resin is not substantially improved. The HCl liberated tends to char the alkyd resin, thus greatly impairing its utility. Furthermore, all free HCl must be removed before the resin is marketed, because the odor of HCl makes it unsalable. The modified alkyd resins of the invention are produced without the liberation of HCl, and their

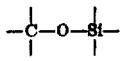

bonds are resistant to hydrolysis.

A silicon-containing alkyd resin of the invention is an ester of components comprising (1) a polyhydric alcohol, (2) a polycarboxylic acid and (3) a polymeric substance whose molecules comprise, as units linked through polymerized olefinic double bonds, (a) a unit of the class consisting of maleic anhydride and esters of maleic and fumaric acids in which each of the alcohol radicals is of the class consisting of 1-chloro-2-propyl, 2-chloro-ethyl, benzyl, tetrahydrofurfuryl, cyclohexyl, phenyl, cresyl, and alkyl, and (b) a unit having the general formula

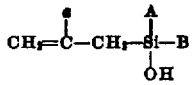

wherein $a$ is of the class consisting of hydrogen and methyl; A is of the class consisting of hydroxy, halo, alkoxy, aroxy, acyloxy, alkyl, benzyl, aromatic hydrocarbon radicals and cycloaliphatic hydrocarbon radicals; and B is of the class consisting of hydroxy, halo, alkoxy, aroxy, acyloxy, alkyl, benzyl, aromatic hydrocarbon radicals of the benzene series and cycloaliphatic hydrocarbon radicals. It has been found that cured characteristics substantially improved over those of the heretofore known alkyd resins are possessed by a resin that is an ester whose molecular structure includes these three components.

Resins of the invention can be prepared by either of two general methods: (1) by hydrolyzing a silicon-containing addition polymer (the preparation of which is described hereinafter) to produce hydrolysis products and heating an organic solvent solution of these hydrolysis products with a polyhydric alcohol and a polycarboxylic acid, or with a product of an esterification reaction of a polyhydric alcohol and a polycarboxylic acid; or (2) by forming a reaction product of a polyhydric alcohol, a polycarboxylic acid and the silicon-containing addition polymer (e. g., by mixing these ingredients and heating).

"Polyhydric alcohol" and "polycarboxylic acid" are used herein to designate the components of an alkyd resin, and "alkyd resin" is used to designate the products of reaction of a polyhydric alcohol and a polycarboxylic acid. The most frequently used polyhydric alcohol is glycerol (either alone or in admixture with other polyhydric alcohols), and the most frequently used polycarboxylic acid is an aromatic dicarboxylic acid (either alone or in admixture with other polycarboxylic acids). (The term "aromatic dicarboxylic acid" is used herein to include any aromatic dicarboxylic acid that is unsubstituted and has from 8 to 12 carbon atoms, or that is substituted with from one to four substituents, each of which is a halo or is an alkyl radical that is primary, secondary or tertiary and has from one to five carbon atoms.) Examples of aromatic dicarboxylic acids include phthalic acid, isophthalic acid, terephthalic acid, naphthalic acid, 4-chlorophthalic acid and tetrachloro-phthalic acid. Ordinarily, it is most desirable to use phthalic acid as the polycarboxylic acid, because it is the most readily available and the least expensive of the preferred acids that are available in pure form. When it is desirable to produce a resin that is comparatively inexpensive, color being not of critical importance, it may be preferable to use abietic acid, usually in the form of dry-distilled rosin, in addition to the polycarboxylic acid. Further if a flame resistant resin is desired, one of the chloro-substituted phthalic acids may be advantageous. In addition, it is usually desirable to modify the composition of an alkyd resin by reacting at least one fatty acid with the polyhydric alcohol, either at the same time that the polycarboxylic acid is reacted with the polyhydric alcohol, or before (i. e., preparing, e. g., a glyceride of the fatty acid and reacting the glyceride with the polycarboxylic acid) or after (i. e., preparing, e. g., a glyceride of the polycarboxylic acid and reacting the glyceride with the fatty acid) the polycarboxylic acid is reacted with the polyhydric alcohol. Examples of the fatty acids that are used to produce alkyds include capric, lauric, myristic, palmitic, stearic, palmitoleic, oleic, linoleic, linolenic, elaeostearic, ricinoleic, and erucic acids. Commercial alkyds are available having an excess of hydroxyl groups (over the total carboxyl groups in the fatty acids and polycarboxylic acids) ranging from about 2 to about 40 per cent, and having a ratio of fatty acid to polycarboxylic acid ranging from about one equivalent of fatty acid per four equivalents of polycarboxylic acid to about three equivalents of fatty acid per five equivalents of polycarboxylic acid. The fatty acids are available commercially as their glycerol esters, which are oils derived from natural sources; examples of the oils that provide sources for the fatty acids include coconut oil, palm kernel oil, babassu oil, murmuru oil, palm oil, rape seed oil, mustard seed oil, olive oil, peanut oil, sesame oil, corn oil, cottonseed oil, soybean oil, sunflower oil, walnut oil, linseed oil, perilla oil, castor oil, tung oil, oiticica oil, whale oil and menhaden oil. Beef tallow, and lard, sardine and herring oils also contain fatty acids. Usually the oil itself is added to the reaction mix to provide the fatty acid or acids.

Although it is possible to produce the resins of the invention by preparing, e. g., a glyceride and then reacting with a polycarboxylic acid or a fatty acid (depending upon which glyceride is produced), a resin of the invention is essentially a modified alkyd resin, regardless of the method of preparation; the following discussion is applicable whatever the method of preparation and is in terms directed to the preferred method, namely, preparing an alkyd resin and then modifying that resin as described herein.

In general, an alkyd resin is produced by a reaction that involves two OH groups, one of which is the hydroxy radical of an alcohol (the alcohol, as indicated herein, is usually polyhydric), and the other of which is in a carboxylic acid radical. Commercially useful alkyds are derived from compositions comprising an excess of from about 2 to about 40 per cent of OH groups derived from alcohols over OH groups derived from carboxylic acids. This excess is used in order to obtain an alkyd resin having a comparatively low acid number without the necessity for an unduly protracted reaction time or the use of a modifying agent such as aniline or toluidine. Alkyd resins with comparatively low acid numbers (usually not higher than about 10) are desirable because they do not react with the pigments ordinarily employed; an alkyd resin with a high acid number may also be unsuited for use with nitrocellulose. (Acid anhydrides are herein considered to have the same number of carboxylic OH groups per molecule as the corresponding acid.) As is hereinbefore stated, the preferred polycarboxylic acids are aromatic dicarboxylic acids, phthalic acid usually being the most desirable, and the preferred polyhydric alcohol is glycerol. As a consequence, the preferred alkyd resins are (modified or unmodified) aromatic dicarboxylic acid glycerides, the most desirable examples being phthalic glycerides. In addition to modification with fatty acids, as hereinbefore described, modification of an alkyd resin that is essentially an aromatic dicarboxylic acid glyceride with other polycarboxylic acids or polyhydric alcohols, or both, may be desirable. It is usually desirable that the ratio of OH groups derived from the aromatic dicarboxylic acid, the fatty acid and the glycerol to total OH groups in the composition that is reacted to produce the alkyd resin be at least about 9:10. If substantially less than nine-tenths of the reacting OH groups are derived from the aromatic dicarboxylic acid, the fatty acid and the glycerol, the characteristics of the finished resin are likely to be impaired. Ordinarily, it is preferable that the ratio of OH groups derived from the aromatic dicarboxylic acid, the fatty acid and the glycerol to total OH groups in the composition be at least about 97:100, and most desirable that it be at least about 99:100. When acids other than aromatic dicarboxylic acids are used to produce an alkyd, or alcohol other than glycerol, the purpose is to modify specific characteristics of the resin; this modification, however, should be accomplished without impairing other desirable characteristics of the resin. It is to avoid impairment of other desirable characteristics of the resin that the proportion of OH groups not derived from the aromatic dicarboxylic acid, the fatty acid and the glycerol is usually not greater than about 1:100.

Any dicarboxylic acid can be used, in the preparation of the alkyd resin, in place of part of the aromatic dicarboxylic acid, and any polyhydric alcohol can be used in place of part of the glycerol. The amount of such modifying agents used should be within the range hereinbefore indicated. The glycols whose use as modifiers is usually preferred include ethylene glycol, propylene glycol, dipropylene glycol, any butylene glycol, any polymethylene glycol in the series from trimethylene glycol to decylene glycol (e. g., decamethylene glycol), or any polyethylene glycol in the series from diethylene glycol to nonaethylene glycol; the acids whose use as modifiers is usually preferred include itaconic, citraconic, maleic, fumaric or mesaconic acid, any normal acid in the series from oxalic and malonic to sebacic, any cyclohexane dicarboxylic acid, or diglycolic, dilactic or resorcinol diacetic acid. Modified alkyd resins can also be produced using monocarboxylic aromatic acids such as benzoic acid, monocarboxylic aliphatic acids having comparatively high boiling points, e. g., butyric, valeric, caproic or enanthic acid, or other polyhydric alcohols, such as pentaerythritol, dipentaerythritol, mixtures of pentaerythritol with pentaerythritol derivatives, mannitol or sorbitol. A rosin-maleic anhydride adduct can also be used to produce alkyd resins.

Alkyd resins can be prepared by mixing the ingredients to be reacted, e. g., glycerol, phthalic acid, a fatty acid and the desired modifying ingredients, in the proportions hereinbefore described, and heating the resulting reaction mixture to a temperature between about 200° C. and about 250° C. It is desirable that this heating be carried out in an inert atmosphere, e. g., of nitrogen or carbon dioxide, and the inert gas can conveniently be bubbled through the reaction mixture to effect stirring. The material is maintained at a temperature between about 200° C. and about 250° C. until the acid number and the viscosity of the resin are within the desired range, usually for a time not shorter than about 4 hours and not longer than about 18 hours. The alkyd resins are usually reacted for a time sufficiently long that the acid number is not higher than 10, and a sufficiently long reaction to give an acid number as low as about 2 may be used. The viscosity of the finished resin is also controlled by controlling the reaction time, i. e., a longer reaction time yields a more viscous resin. In general, an alkyd resin having a longer oil length is subjected to a longer reaction than is a resin with a shorter oil length. When the alkyd has been reacted to the requisite extent it is cooled and diluted to the desired per cent of solids with a hydrocarbon solvent, frequently xylene, toluene, a petroleum solvent (e. g., "Varnolene," a fraction obtained in the distillation of petroleum, boiling between 310° F. and 410° F., which consists substantially of high boiling aliphatic hydrocarbons), or an aliphatic hydrocarbon such as a heptane, or an octane. Other solvents, for example higher alcohols of the aliphatic series (e. g., butanols and higher) or higher boiling ethers (e. g., dibutyl ethers, propyl butyl ethers and higher) can be used, but it is usually preferred that the solvent be a simple hydrocarbon. Most commercial alkyds have from about 50 to about 65 weight per cent solids, but the alkyds can be diluted by adding additional solvent, or a non-commercial alkyd may be used having any desired solids content. It is ordinarily economically preferable that the alkyd contain from about 40 to about 65 weight per cent solids, although more dilute solutions can be used; more concentrated alkyds are not commercially feasible, and using more dilute alkyds ordinarily requires distillation of an unreasonable amount of solvent during the heating of the resin after mixing with the hydrolysis products.

The resins of the invention are defined as esters of components comprising (1) a polyhydric alcohol, (2) a polycarboxylic acid and (3) a polymeric substance; this terminology is adopted to explain the structure of the resins produced, not the structure of starting materials or methods of preparation.

Resins of the invention are produced from starting materials which comprise (1) a polyhydric alcohol, (2) a polycarboxylic acid and (3) a silicon-containing addition polymer.

The molecules of the silicon-containing addition polymer comprise, as units linked through polymerized olefinic double bonds, (a) a unit of the class consisting of maleic anhydride and esters of ethylene alpha,beta-dicarboxylic acids (i. e., maleic and fumaric acids) in which each of the alcohol radicals is of the class consisting of mono-chloro-substituted alkyl radicals having from two to three carbon atoms and having at least one hydrogen atom attached to the same carbon atom as the free valence (e. g., 1-chloro-2-propyl and 2-chloroethyl), tetrahydrofurfuryl, cyclohexyl, monovalent hydrocarbon radicals of the benzene series having from six to seven carbon atoms (i. e., phenyl, benzyl, o-cresyl, m-cresyl and p-cresyl) and alkyl radicals having from one to eight carbon atoms and having at least one hydrogen atom attached to the same carbon atom as the free valence (i. e., methyl, ethyl, propyl, isopropyl, n-butyl, isobutyl, secondary butyl, and primary or secondary alkyl radicals having from five to eight carbon atoms); and (b) a unit having the general formula

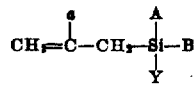

wherein $a$ is a hydrogen or methyl radical, Y is hydrolyzable radical of the class consisting of alkoxy, aroxy, acyloxy and halo. The alkoxy radical is any primary or secondary alkoxy radical having from one to four carbon atoms, for example, methoxy, ethoxy, propoxy, isopropoxy, n-butoxy, isobutoxy and secondary butoxy. The aroxy radical is any in which the aryl group is a monovalent aromatic hydrocarbon radical having the free valence attached to the nucleus, having from six to eleven carbon atoms, and having not more than three side chains consisting of alkyl radicals whose total number of carbon atoms is not more than five (i. e., a phenyl radical, or an ortho-, meta- or para-methyl phenyl, any di- or tri-methyl phenyl, or any substituted phenyl in which the substituents are: one ethyl; one ethyl and one methyl; two ethyls; two methyls and one ethyl; two ethyls and one methyl; either propyl radical; either propyl radical and ethyl; any butyl radical; any butyl radical and methyl; or any pentyl radical). The acyloxy radical has the general formula

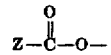

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbons atoms, as hereinbefore described. The halo radical is one having an atomic weight less than 80 (i. e., chloro, bromo, or fluoro).

A is a hydroxy radical, a hydrolyzable radical (as is hereinbefore described), an alkyl radical having from one to twelve carbon atoms and having at least one hydrogen atom attached to the same carbon as the free valence (i. e., methyl, ethyl, propyl, isopropyl, n-butyl, isobutyl, secondary butyl, or a primary or secondary alkyl radial having from five to twelve carbon atoms), a benzyl radical, an aromatic hydrocarbon radical (a monovalent aromatic hydrocarbon radical having the free valence attached to a nucleus, having not more than two benzene nuclei that contain not more than ten carbon atoms, having from six to twenty-five carbon atoms, and having not more than three side chains consisting of alkyl radicals of not more than five carbon atoms, i. e., a phenyl radical or a naphthyl radical, or a mono-, di-, or tri-alkyl-substituted phenyl or naphthyl radical in which the alkyl radicals, if more than one, are the same or different and each alkyl radical is methyl, ethyl, propyl, isopropyl, n-butyl, isobutyl, secondary butyl, tertiary butyl, or a primary, secondary, or tertiary alkyl radical having five carbon atoms, or a cycloaliphatic hydrocarbon radical; "cycloaliphatic hydrocarbon radical" is used herein to mean a monovalent cycloaliphatic hydrocarbon radical having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms (i. e., a cyclopentyl or a cyclohexyl radical, or a mono- or di-alkyl-substituted cyclopentyl or cyclohexyl radical in which the alkyl radicals, if more than one, are the same or different, and are attached to different nuclear carbon atoms not more than one of which is adjacent to the carbon atom attached to the free valence, and each alkyl radical is methyl, ethyl, propyl, isopropyl, n-butyl, isobutyl, secondary butyl, tertiary butyl, or a primary, secondary or tertiary alkyl radical having five carbon atoms).

B is a hydroxy radical, a benzyl radical, one of the hereinbefore defined hydrolyzable radicals, a primary or secondary alkyl radical having from one to twelve carbon atoms, as hereinbefore described, a cycloaliphatic hydrocarbon radical, or an aromatic hydrocarbon radical of the benzene series; "aromatic hydrocarbon radical of the benzene series" is used herein to mean a monovalent aromatic hydrocarbon radical having a single nucleus to which the free valence is attached, having from six to twenty-one carbon atoms, and having not more than three side chains consisting of alkyl radicals of not more than five carbon atoms (i. e., a phenyl radical, or a mono-, di-, or tri-alkyl-substituted phenyl radical in which the alkyl radicals, if more than one, are the same or different and each alkyl radical is methyl, ethyl, propyl, isopropyl, n-butyl, isobutyl, secondary butyl, tertiary butyl, or a primary, secondary or tertiary alkyl radical having five carbon atoms).

Examples of esters with which the silanes may be polymerized include dimethyl maleate, diethyl maleate, diisopropyl maleate, di-n-propyl maleate, di-act-amyl maleate, diethyl fumarate, dipropyl fumarate, diisopropyl fumarate, diisobutyl fumarate, bis-(beta-chloroethyl)fumarate, di-act-amyl fumarate, diphenyl fumarate, diphenyl maleate, dibenzyl fumarate, dibenzyl maleate, di-p-tolyl fumarate and tetrahydrofurfuryl maleate. Other esters may be prepared by reacting maleic or fumaric acid, or maleic anhydride, with an alcohol by the usual methods of esterification, or by reacting the acid chloride with the alcohol. The alcohols which may be so reacted include methyl alcohol, ethyl alcohol, n-propyl alcohol, iso-propyl alcohol, n-butyl alcohol, ethylmethylcarbinol, n-amyl alcohol, n-hexyl alcohol, hexan-2-ol, n-hexyl carbinol, 4-heptanol, n-octanol, cyclohexanol, 1-chloro-2-proponal, 2-chloroethanol, benzyl alcohol, tetrahydrofurfuryl alcohol, phenol, o-cresol, m-cresol and p-cresol.

Usually it is preferred that the modified alkyd resin of the invention be an ester of components comprising (1) a polyhydric alcohol, (2) a polycarboxylic acid and (3) a polymeric substance as hereinbefore defined in which the first unit of the polymeric substance is an ester of an ethylene alpha,beta-dicarboxylic acid, i. e., maleic or fumaric acid, in which each ester of the alcohol radicals is a primary or secondary alkyl radical having from one to eight carbon atoms; it is also preferred that the second unit of the polymeric substance have the general formula

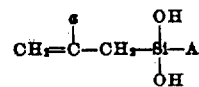

and most desirable that it have the general formula

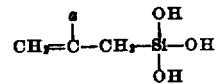

(wherein $a$ and A have the meanings hereinbefore indicated).

Methallylalkoxysilanes are prepared by the procedure demonstrated hereinafter. Alkoxysilanes having an allyl or methallyl radical attached to the silicon atom are reacted with a Grignard reagent to prepare further-substituted silanes, according to Equation 1 or 2 (below):

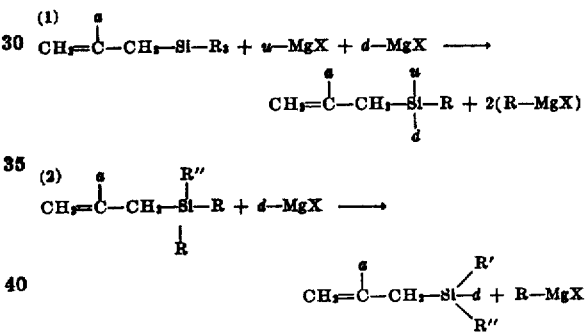

wherein X is chloro, bromo or iodo; $a$ is hydrogen or methyl; each of the radicals R, R' and R" is an alkoxy radical hereinbefore described; R, R' and R" may be the same or different; $u$ is of the class consisting of benzyl, primary and secondary alkyl radicals having from one to twelve carbon atoms, monovalent hydrocarbon radicals of the benzene series having the free valence attached to the nucleus, having from six to twenty-one carbon atoms, and having not more than three side chains consisting of alkyl radicals of not more than five carbon atoms, and monovalent cycloaliphatic hydrocarbon radicals having a single nucleus containing from five to six carbon atoms one of which is connected to the free valence and to a hydrogen atom, another of which, adjacent to the first, is connected to two hydrogen atoms, and the rest of which are each connected to at least one hydrogen atom, having from five to sixteen carbon atoms, and having not more than two side chains consisting of alkyl radicals of not more than five carbon atoms; and $d$ is a radical of the same class as $u$ or a monovalent hydrocarbon radical of the naphthalene series having the free valence attached to a nucleus, having from ten to twenty-five carbon atoms, and having not more than three side chains consisting of alkyl radicals of not more than five carbon atoms (i. e., a naphthyl radical that is unsubstituted, or is substituted with one, two or three similar or dissimilar alkyl radicals).

The reaction is carried out under anhydrous conditions, preferably by slowly adding one halo-substituted hydrocarbon, d—X, or two halo-substituted hydrocarbons, u—X and d—X, to a reaction mixture comprising magnesium and a methallylalkoxysilane or an allylalkoxysilane

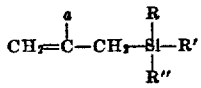

A magnesium halide of the hydrocarbon (Grignard reagent) is formed, which then reacts with the allylalkoxysilane or methallylalkoxysilane.

The halo-substituted hydrocarbons that may be used include primary and secondary alkyl halides having from one to twelve carbon atoms, such as methyl bromide or chloride or iodide, ethyl bromide or chloride, n-propyl bromide or chloride, isopropyl bromide or chloride, n-butyl bromide or chloride, secondary butyl bromide or chloride, isobutyl bromide or chloride, n-amyl bromide, isoamyl bromide, secondary amyl bromide, n-hexyl bromide, n-heptyl bromide, 3-bromoheptane, 4-bromoheptane, n-octyl bromide, 2-bromooctane, 2-iodononane, 1-bromo-3-methylnonane, 4-chloro-4-methylnonane, 5-chloro-5-methylnonane, 2-bromodecane, 1-bromo-6-methyldecane, 2-chloro-2-methyldecane, 5-chloro-5-ethyldecane, 1-bromododecane and 4-bromododecane; benzyl halides (benzyl chloride, benzyl bromide and benzyl iodide); halo derivatives of hydrocarbons of the benzene series, including bromobenzene, m-bromotoluene, p-bromotoluene, 4-bromo-o-xylene, 4-bromo-m-xylene, 5-bromo-m-xylene, 2-bromo-p-xylene, 3-bromopseudocumene, 5-bromopseudocumene, 6-bromopseudocumene, 2-bromomesitylene, 3-bromo-o-xylene, 2-bromo-1-ethyl benzene, 4-bromo-1-ethyl benzene, 4-bromo-1,3-diethyl benzene, 2-iodo-1,3,5-triethyl benzene, 6-bromo-3-ethyl toluene, 2-bromo-4-ethyl toluene, 4-bromo-1-propyl benzene, 4-bromo-isopropyl benzene, 4-bromo-1-methyl-3-isopropyl benzene, 6-bromo-1-methyl-3-isopropyl benzene, 2-bromo-p-cymene, 3-bromo - p - cymene, 4 - bromo-1-butyl benzene, 4-bromo-1-tertiary butyl benzene, 4-bromo-1-isoamyl benzene and 4-bromo-1-tertiary amyl benzene; halo derivatives of hydrocarbons of the naphthalene series, including alpha-bromonaphthalene, beta-bromonaphthalene, 1-bromo-8-methyl naphthalene, 1-bromo-7-methyl naphthalene, 1-bromo-2-methyl naphthalene, 4-bromo-2-methyl naphthalene, 8-bromo-2-methyl naphthalene, 1-bromo-5-methyl naphthalene, 1-bromo-2,7-dimethyl naphthalene, 4-bromo-1,6-dimethyl naphthalene, 1-bromo-2,6-dimethyl naphthalene, 4-bromo-1,2-dimethyl naphthalene, 1-bromo-2,3-dimethyl naphthalene, 1-bromo-4-methyl naphthalene and 7-bromo-1-methyl naphthalene; and cycloaliphatic halides, such as bromocyclohexane, chlorocyclohexane, 2-methyl-1-bromocyclohexane, 2-methyl - 1 - chlorocyclohexane, 2-methyl-1-iodocyclohexane, 3-methyl-1-bromocyclohexane, 3-methyl - 1 - chlorocyclohexane, 3-methyl-1-iodo-cyclohexane, 4-methyl-1-bromocyclohexane, 4-methyl - 1 - chlorocyclohexane, 3,5-dimethyl-1-bromocyclohexane, 1-methyl - 4 - isopropyl - 3 - bromocyclohexane, 1-methyl-4-isopropyl - 3 - chlorocyclohexane, 4-n-propyl - 1 - bromocyclohexane, 3,4-diethyl-1-bromocyclohexane, 3-tertiary-butyl - 1 - chlorocyclohexane, bromocyclopentane, chlorocyclopentane, 3-ethyl-1-bromocyclopentane, and 3-isoamyl-1-bromocyclopentane.

In the formation of the Grignard reagent the theoretical reaction of one molecule of the halo-substituted hydrocarbon with each atom of magnesium is substantially complete, and it is preferable to use the halo-substituted hydrocarbon and magnesium in approximately the theoretical proportions since a substantial excess of either ingredient is unreacted. The magnesium used in the reaction is in a finely divided form, such as ribbon or turnings. The halo-substituted hydrocarbon and the allylalkoxysilane or methallylalkoxysilane used are those that yield the desired product. Since the reaction of magnesium with a chloro-substituted hydrocarbon does not "start" as readily as the reaction with a bromo-substituted hydrocarbon, it is usually necessary to initiate the reaction by the addition of a small amount (e. g., about 2 or 3 per cent of the magnesium) of a bromo-substituted hydrocarbon "starter," such as ethyl bromide or bromobenzene. (The terms "per cent" and "parts," as used herein to refer to quantities of material, mean per cent and parts by weight unless otherwise qualified.)

Although the Grignard reactions between a magnesium halide of the hydrocarbon and an allylalkoxysilane or a methallylalkoxysilane represented by Equations 1 and 2 (above) proceed whenever the reactants, in any molar ratio, are brought together under proper conditions, it is not economically practicable to prepare silanes represented by the general formula

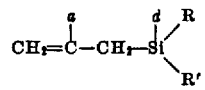

or

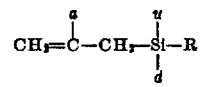

by using less than about ½ mol of a hydrocarbon magnesium halide per mol of an allylalkoxysilane or methallylalkoxysilane. It is not economically practicable to prepare a dialkoxysilane by using more than about 1½ mols of a hydrocarbon magnesium halide per mol of an allyltrialkoxysilane or methallyltrialkoxysilane. If it is desired to prepare a monoalkoxysilane, it is preferable to use at least about 1½ mols of a hydrocarbon magnesium halide per mol of an allylalkoxysilane or methallylalkoxysilane, but it is not economically practicable to use more than about 3½ mols of a hydrocarbon magnesium halide per mol of an allylalkoxysilane or methallylalkoxysilane. The minimum ratio of reactants is that below which a substantial yield of the desired product is not obtained, while the maximum ratio of reactants is that above which the yield of desired silanes (based on the amount of hydrocarbon magnesium halide used) decreases materially, for example, because of byproduct formation. In the preparation of a dialkoxysilane it is most economical to use the hydrocarbon magnesium halide and the allyltrialkoxysilane or methallyltrialkoxysilane in a molal ratio of about 1:1. In the preparation of a monoalkoxysilane it is most economical to use the hydrocarbon magnesium halide and the allylalkoxysilane or methallylalkoxysilane in a molal ratio of about 2:1 or 3:1. For example, when phenyl magnesium bromide (about 18 parts) is reacted with methallyltriethoxysilane (about 22 parts), in a molal ratio of about 1:1, the resulting product contains phenylmethallyldiethoxysilane (about 10 parts). When phenyl magnesium bromide (about 27 parts) is reacted with methallyltriethoxysilane (about 22 parts), in a molal ratio of about 1½:1, the resulting product contains phenylmethallyldiethoxysilane (about 7 parts) and diphenylmethallylethoxysilane (about 4 parts).

In the most desirable procedure, the magnesium is added to the flask, and dropwise addition of the halo-substituted hydrocarbon is begun as soon as the Grignard reaction has been initiated by means of the "starter," hereinbefore described. When the Grignard reaction is proceeding so as to be noticeably exothermic the allylalkoxysilane or methallylalkoxysilane and ether are added slowly through the reflux condenser. After addition of the allylalkoxysilane or methallylalkoxysilane and ether, dropwise addition of the halo-substituted hydrocarbon is continued at a rate sufficient to maintain moderate refluxing of the ether.

The reaction takes place readily at ordinary temperatures with noticeable formation of a grayish precipitate and with evolution of heat as soon as the reactants are brought together. Since the reaction is exothermic in nature and becomes extremely violent if the halo-substituted hydrocarbon is added too rapidly, it is usually desirable to keep the temperature of the reaction mixture down to about 40° C. (e. g., by means of an ice bath) so that the halo-substituted hydrocarbon may be added at a reasonable rate. The reaction may be carried out at comparatively high temperatures under pressure (e. g., in a bomb), but the maximum temperature at atmospheric pressure is the boiling point of the reaction mixture.

The reaction is carried out in the absence of moisture and oxygen since any water which is present causes hydrolysis of the reactants and the products, and any oxygen which is present may decompose the Grignard reagent by oxidation. On the other hand, it is usually desirable to carry out the reaction in the presence of a volatile solvent or diluent, such as (anhydrous) ether.

In the preferred procedure, employing ether, the reaction is carried out in a closed vessel equipped with cooling means, an agitator and a condenser. Such a reaction is carried out at the reflux temperature of the ether so that the maximum output of heat generated during the reaction may be removed (by way of the reflux condenser). The ether vapor over the reaction mixture serves as a "vapor seal" to exclude air (containing both moisture and oxygen) from the reaction. However, the presence of a great excess of ether may have a tendency to reduce the yield, and the amount of ether used is preferably that amount required to keep the reaction mixture in a highly fluid state (thereby avoiding points of concentrated reaction), for example, an amount of ether equal to about one-half the weight of the reaction mixture.

After the halo-substituted hydrocarbon is added the reaction mixture is refluxed for several hours in order to ensure complete reaction. To prepare certain silanes (e. g., alkyl- and cycloaliphatic-substituted silanes) it is necessary to distill the ether and heat the residue strongly for several hours. After the reaction is completed, the magnesium salts (in the form of a grayish precipitate) in the reaction mixture are removed (preferably by filtration), the filter is washed with ether or benzene, and the volatile substances in the reaction mixture, which include by-products and diluents, are removed by distillation at atmospheric pressure. The silanes in the product are obtained readily in a substantially pure state by (vacuum) fractional distillation.

Alkenylhalosilanes can be produced by a method that comprises pyrolyzing a silane whose molecule consists of a silicon atom to which are attached four radicals not more than two of which are unsubstituted saturated monovalent hydrocarbon radicals, from one to three of which are halos each having an atomic weight less than 80, and one of which is a 2-halo or 3-halo propyl or isobutyl radical in which the halogen has an atomic weight between 20 and 80.

The silane may be vaporized in suitable equipment and then conducted to a heated reaction zone where pyrolysis occurs. An inert gas may be passed through the equipment to serve as a carrier for the silanes, but this is not essential. Before pyrolysis is started it is desirable that the equipment be flushed with a heated inert gas in order to remove any substance with which any of the silanes would react. The vaporous silanes that are discharged from the reaction zone may be condensed in a train of condensers consisting of a water-cooled condenser followed by a number of Dry Ice traps sufficient to reduce all the vapor to the liquid phase. Any hydrogen halide produced by the pyrolysis is collected in a water scrubber which follows the last Dry Ice trap. The liquid collected in the different traps may be combined and the various constituents separated by fractional distillation through a packed column. Allylhalosilanes and methallylhalosilanes may be produced by this method.

Silanes having hydrolyzable radicals which consist of acyloxy groups are produced by reaction between an acid anhydride and appropriate silanes having hydrolyzable radicals which consist of alkoxy groups, or, in some instances, by reaction between an appropriate silane having hydrolyzable halo radicals and the sodium salt of the suitable organic acid.

Silanes having aroxy radicals attached to the silicon atom in the silane molecule are prepared by reaction between the corresponding halosilane and phenol or a monoalkyl-, di-alkyl- or trialkyl-substituted phenol in which each alkyl substituent has from one to five carbon atoms, and all the alkyl substituents contain a total of not more than five carbon atoms, as hereinbefore described.

The following is a procedure for preparing a methallyltrialkoxysilane (methallyltriethoxysilane) by means of a Grignard reaction of a methallyl magnesium halide and an alkyl orthosilicate (ethyl orthosilicate).

*Procedure 1.*—A charge consisting of finely divided magnesium turnings (107.5 grams) and an alkyl orthosilicate (1248 grams of ethyl orthosilicate) is put into a three-necked flask and the flask is then fitted with a dropping funnel, a mercury-sealed stirrer and a reflux condenser equipped with a calcium chloride tube. A "starter" consisting of a bromo-substituted hydrocarbon (2 ml. of ethyl bromide) is added to the charge (to initiate a reaction) and the flask begins to get warm. A methallyl halide (442.5 grams of methallyl chloride) is then added dropwise with stirring through the dropping funnel over a period of fifty minutes, during which time the heat of reaction causes the temperature of the charge to remain around 75–80 degrees C. After the addition of the methallyl halide is completed, the material in the flask is heated with stirring at approximately 120 degrees C. for one hour. The resulting reaction mixture, which contains a large amount of grayish precipitate (magnesium salts), is filtered, the filter cake is washed with an amount of benzene equal to two or three times the volume of the filtrate and the benzene is added to the filtrate. The volatile materials (e. g., benzene and bimethallyl) in the resulting filtrate are distilled, through a column packed with glass helices, at atmospheric pressure by heating the filtrate to about 125 degrees C., and the remainder of the filtrate is separated by distillation at 15–20 mm. Hg. (i. e., at an absolute pressure equal to about 15–20 mm. of mercury) to obtain unreacted alkyl orthosilicate, the methallylalkoxysilane, the usual intermediate cut (i. e., a fraction distilling at temperatures between the boiling temperature of the alkyl orthosilicate and that of the methallyltrialkoxysilane) and a small amount of heavy oil-like liquid bottoms. The silane product (216 grams of methallyltriethoxysilane) is found to be in a substantially pure state, and to have an index of refraction at 20 degrees C. ($n_D^{20}$) of 1.4140 and a boiling point of 86 degrees C. at 19 mm. Hg.

Methyl, propyl, isopropyl, n-butyl, isobutyl, and secondary butyl orthosilicates, when employed in the same molar proportions in the foregoing Grignard reaction, give the corresponding methallylalkoxysilanes.

*Procedure 2.*—The following procedures are methods for preparing other silanes represented by the general formula

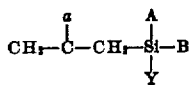

as hereinbefore defined.

A Grignard reaction between an alkyl magnesium halide and a methallylalkoxysilane is used to produce an alkylmethallyldialkoxysilane and a dialkylmethallylalkoxysilane (e. g., n-butylmethallyldiethoxysilane and di(n-butyl)methallylethoxysilane) according to the following procedure: A charge of finely divided magnesium turnings (72 grams) is put into a three-necked flask and the flask is then fitted with a dropping funnel, a mercury-sealed stirrer and a reflux condenser equipped with a calcium chloride tube. A "starter" consisting of a bromo-substituted hydrocarbon in an absolute ether solution (8 grams of n-butyl bromide in 25 ml. of diethyl ether) is added to the charge (to initiate a reaction) and the flask begins to get warm. Dropwise addition of an alkyl halide (403 grams of n-butyl bromide) is then started. Absolute diethyl ether (575 ml.) is added through the reflux condenser, and addition of the alkyl halide is continued at a rate sufficiently slow to avoid violent boiling of the reaction mixture. After the addition of the alkyl halide, which requires about six hours, a methallyltrialkoxysilane (218 grams of methallyltriethoxysilane) is added dropwise over a period of about one hour. The ether is then distilled from the mixture and the residue is heated strongly for eight hours. The solid cake of salts remaining in the flask is washed with benzene (about 1½ liter) and filtered. The filter cake is well washed with benzene which is added to the filtrate. The volatile materials such as benzene are distilled from the filtrate through a column packed with glass helices at atmospheric pressure by heating the filtrate to about 125° C., and the remainder of the filtrate is separated by distillation at about 10 to 15 mm. Hg to obtain 76 grams of di(n-butyl)-methallylethoxysilane (B. P. 118–119° C. at 13 mm. Hg; $n_D^{20}$ 1.4410;

$$d\frac{20}{20}\ 0.8394)$$

and 23 grams of n-butylmethallyldiethoxysilane (B. P. 96–98° C. at 16 mm. Hg; $n_D^{20}$ 1.4270;

$$d\frac{20}{20}\ 0.8731)$$

A Grignard reaction between an aryl halide and a methallylalkoxysilane is used to produce arylmethallylalkoxysilanes, for example, phenylmethallyldiethoxysilane and diphenylmethallylethoxysilane, by a procedure that is the same as Procedure 1 except that the ingredients used are 72 grams of magnesium; 37 grams of bromobenzene and 25 ml. of diethyl ether, as the "starter"; 436 grams of methallyltriethoxysilane (in 775 ml. of diethyl ether); and 434 grams of bromobenzene. The "starter" is added to the magnesium first, dropwise addition of bromobenzene is started as soon as the flask begins to get warm, and the methallyltriethoxysilane and ether are then added through the reflux condenser. During the addition of the bromobenzene the flask is packed in ice and the temperature of the charge remains at about 40° C. After all of the bromobenzene has been added, refluxing is continued for three hours. The resulting reaction mixture is cooled and filtered; the cake is washed with about one liter of dry benzene which is added to the filtrate; and the filtrate is distilled to yield 85 grams of diphenylmethallylethoxysilane (B. P. 180–185° C. at 17 mm. Hg; $n_D^{20}$ 1.5259) and 145 grams of phenylmethallyldiethoxysilane (B. P. 142–144° C. at 20–21 mm. Hg; $n_D^{20}$ 1.4840).

A benzylmethallyldialkoxysilane (benzylmethallyldiethoxysilane) is prepared by a procedure that is the same as Procedure 1 except that the ingredients are 48 grams of magnesium, 253 grams of benzyl chloride, and 218 grams of methallyltriethoxysilane (in 975 ml. of diethyl ether). A "starter" consisting of 5 ml. of ethyl bromide in 25 ml. of diethyl ether is added to the magnesium in the flask. As soon as the reaction has started, dropwise addition of the benzyl chloride is begun, and the ether solution of methallyltriethoxysilane is added through the reflux condenser. Dropwise addition of the benzyl chloride is continued at a rate sufficient to maintain moderate refluxing of the ether. After the addition of benzyl chloride is completed, the reaction mixture is refluxed for about 24 hours, and the ether is then removed from the reaction mixture by distillation. Toluene (500 ml.) is added, and the resulting mixture is refluxed for about 6 hours. The reaction mixture is cooled and filtered; the cake is washed with toluene (500 ml.); the filtrate and washings are placed in a Claisen flask; and the toluene is distilled. Further precipitation accompanies distillation of the toluene. The reaction mixture is separated from the salts in the Claisen flask and is fractionated under reduced pressure to yield 50 grams of benzylmethallyldiethoxysilane (B. P. 106° C. at 4 mm. Hg; $n_D^{20}$ 1.4973;

$$d\frac{20}{20}\ 0.9626)$$

A cycloalkylmethallylalkoxysilane (cyclohexylmethallyldiethoxysilane) is prepared by a procedure that is the same as Procedure 1 except that the ingredients are 24.3 grams of magnesium; 218 grams of methallyltriethoxysilane (in 480 ml. of diethyl ether); and 163 grams of cylohexyl bromide. The magnesium is placed in the flask, and the Grignard reaction is initiated by adding 7 grams of cyclohexyl bromide in 20 ml. of diethyl ether. The flask begins to get warm, and the methallyltriethoxysilane (in the ether solution) and 21 grams of the cyclohexyl bromide are added slowly to the magnesium, over a period of about fifteen minutes. After this addition has been made, the remainder of the cyclohexyl bromide is added dropwise, over a period of about three hours, and the resulting solution is refluxed for about one hour. The ether is distilled from the reaction mixture until the temperature has risen to about 125° C., and the reaction mixture is maintained at that temperature for about two to three hours, until the liquid becomes thick from salts. The ether is then reintroduced and the reaction mixture is refluxed for about 4 hours. The resulting reaction mixture is cooled and filtered; the cake is washed with benzene which is added to the filtrate; and the filtrate is separated to yield 68 grams of cyclohexylmethallyldiethoxysilane (B. P. 133° C. at 20 mm. Hg; $n_D^{20}$ 1.4560;

$$d\frac{20}{20} 0.9245)$$

A cyclopentylmethallylalkoxysilane (cyclopentylmethallyldiethoxysilane) is prepared by carrying out a procedure that is the same as that described in the preceding paragraph except that the ingredients used are 24.3 grams of magnesium; 218 grams of methallyltriethoxysilane (in 295 ml. of ether); and 149 grams of cyclopentyl bromide. A "starter," consisting of 9 grams of the cyclopentyl bromide in 15 ml. of ether, is added to the magnesium in the flask. When the reaction has started the methallyltriethoxysilane and the ether are added to the magnesium; the remainder of the cyclopentyl bromide is added dropwise, over a period of about three hours; and the reaction mixture is held at about 70° C. for about one hour. The ether is distilled from the reaction mixture, which is then held at about 165° C. for about two hours. The resulting reaction mixture is cooled and filtered; the filter cake is washed with diethyl ether, which is added to the filtrate; and the filtrate is separated to yield 52 grams of cyclopentylmethallyldiethoxysilane (B. P. 123–126° C. at 21 mm. Hg; $n_D^{20}$ 1.4460;

$$d\frac{20}{20} 0.9205)$$

Alkyl-substituted cycloalkylmethallylalkoxysilanes (e. g., 4-tertiary-amylcyclohexylmethallyldiethoxysilane) are prepared by carrying out a procedure that is the same as that described in the preceding paragraph except that the ingredients used are 33.6 grams of magnesium; 305.2 grams of methallyltriethoxysilane (in 80 ml. of diethyl ether) and 326.2 grams of 4-tertiary-amylcyclohexyl bromide. The "starter" consists of 6.2 grams of the 4-tertiary-amylcyclohexyl bromide in 20 ml. of the ether. Dropwise addition of the 4-tertiary-amylcyclohexyl bromide requires about three and one-half hours. After the reaction mixture has been held at about 70° C. for one hour the ether is distilled, and the reaction mixture is held at about 135° C. for about four hours. The reaction mixture is cooled and filtered; the filter cake is washed with ether which is added to the filtrate; and the filtrate is separated to yield 130 grams of 4-tertiary-amyl-cyclohexylmethallyldiethoxysilane (B. P. 157–162° C. at 5 mm. Hg; $n_D^{20}$ 1.4639;

$$d\frac{20}{20} 0.9195)$$

The procedures given hereinbefore may be carried out using the allylalkoxysilanes, instead of the methallylalkoxysilanes, to produce the corresponding allyl compounds.

The mechanism by which the polymerization of the silane with the maleic anhydride or the ester proceeds to form the silicon-containing addition polymer is not entirely clear, but, apparently, addition polymerization is usually the dominant reaction. The addition polymerization is thought to take place by reaction between the double bonds and to result in a long-chain, virtually saturated molecule. Figure (a) shows a molecule of dimethyl maleate and a molecule of a silane and Figure (b) shows the addition heteropolymer which would result from the polymerization of the molecules shown in Figure (a).

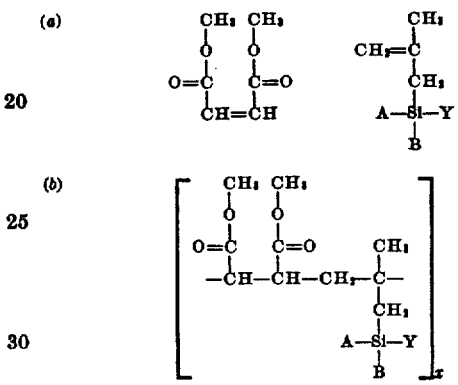

A, Y and B have the meanings hereinbefore described, and $x$ is an integer of unknown magnitude. It is probable, of course, that the polymerization does not proceed with the regularity in the repeating unit indicated in Figure (b).

The polymerization takes place when the silane and the anhydride or ester are brought together, in any ratio, with a catalyst, and is expedited by heating. The catalyst may be any organic peroxide, such as benzoyl peroxide, succinyl peroxide, acetyl peroxide, peracetic acid, perbenzoic acid, toluene peroxide, parabromobenzoyl peroxide, anisoyl peroxide, chloroacetyl peroxide, acetyl benzoyl peroxide, diacetyl peroxide, or furoyl peroxide, or any organic ozonide, such as diisopropyl ozonide, or diisobutylene ozonide or a mixture of such substances. The amount of catalyst used is ordinarily within the range from about 0.05 per cent of the reaction mixture (an amount at which polymerization proceeds at a rate that is at least appreciable, but not necessarily rapid enough for practical use) to about 5 per cent (an amount above which no appreciable increase in effect is observed). In most cases, the amount of catalyst that causes the reaction to proceed at the desired rate is from about 0.1 per cent to about 3 per cent.

In some instances it is desirable to carry out the polymerization in the presence of a solvent, such as methyl ethyl ketone or dioxane, because of the use of immiscible reactants (e. g., maleic anhydride and methallyltriethoxysilane).

The specific properties of any one heteropolymer can be varied widely by changing the ratio of reactants, so that the proportions of reactants used depend upon the end use of the heteropolymer. However, since the predominant reaction apparently is an addition polymerization, and neither component is polymerizable alone, it is advisable to react the silane with maleic anhydride or the ester in about 1:1 molar proportions so that there is about one allyl or methallyl radical, containing one olefinic double bond, per olefinic double bond in the maleic anhydride, or in the acid part of the ester molecule.

The rate at which the polymerization proceeds depends upon the reactants used and the temperature. Some reactants polymerize more readily than others, and the polymerizations of maleic anhydride with the silanes are strongly exothermic, self-sustaining reactions, beginning almost as soon as the reactants are warmed. The temperature at which the polymerization is conducted is that which gives the desired degree of polymerization in a reasonable time (usually about 24 hours), and is usually between 50 and 75° C. for the polymerization of the esters with the silanes.

The characteristics of the polymerization reaction and of the resulting product depend upon the silane used (i. e., upon what two radicals, in addition to the hydrolyzable and allyl or methallyl radicals, are attached to the silicon atom in the silane molecule), the ester or acid anhydride used, the temperature at which polymerization proceeds, the time during which polymerization proceeds, and in some instances, the amount of catalyst. For example, maleic anhydride and methallyltriethoxysilane in a molar ratio of 1:1 with 1 per cent of benzoyl peroxide polymerize in about ten minutes, to yield a thick syrup. The polymerization of the esters of maleic acid with the methallylethoxysilanes is slower than the polymerization of the corresponding fumaric acid esters with these silanes, and the products appear to have a lower molecular weight, and a greater tendency to remain fusible materials. The polymerization of maleic anhydride and methallyltriethoxysilane in a molar ratio of 1:1 with 5 per cent of benzoyl peroxide proceeds with almost explosive violence, as soon as the reaction mixture is warm, to yield a hard, glass-like heteropolymer in from one to two minutes, while the polymerization of maleic anhydride with methallyltriethoxysilane in a 1:1 molar ratio with 1 per cent of benzoyl peroxide in an equal volume of dioxane, proceeds in about ten minutes to yield a thick syrup.

The viscosity of a given heteropolymer depends upon the temperature at which the polymerization proceeds, and upon the duration of the polymerization (e. g., the viscosity of a heteropolymer of methallyltriethoxysilane and diethyl fumarate, as determined by efflux time from a 25 ml. pipette, varies with polymerization time at 75° C. as follows: after 18 hours the efflux time is 143.0 seconds; after 24 hours the efflux time is 211.2 seconds and after 46 hours the efflux time is 259.7 seconds).

Since at least one alkoxy radical is attached to each silicon atom in the polymer molecules, and since the polymerization product is of sufficiently low molecular weight so that it is a liquid or a soluble, fusible solid, hydrolysis after polymerization is possible.

Silicon containing addition polymers can be prepared by the following methods:

A methallylalkoxysilane (2.5 grams of phenylmethallyldiethoxysilane; or 2.3 grams of n-butylmethallyldiethoxysilane; or 2.8 grams of diphenylmethallylethoxysilane) is mixed with a dialkyl fumarate (1.7 grams of diethyl fumarate), and benzoyl peroxide (0.04 gram) is added. This mixture is polymerized by heating in an electric oven for twenty-four hours at 75 degrees C. The polmerization product is in each case a colorless syrup.

A methallyltrialkoxysilane (10.9 grams of methallyltriethoxysilane) and a dialkyl maleate (10.0 grams of dipropyl maleate) are mixed and benzoyl peroxide (0.21 gram) is added. This mixture is polymerized by heating in an electric oven for forty-eight hours at 70 degrees C. The polymerization product is a low viscosity oil.

A benzylmethallyldialkoxysilane (13.2 grams of benzylmethallyldiethoxysilane) and a dialkyl fumarate (8.6 grams of diethyl fumarate) are mixed and benzoyl peroxide (0.22 gram) is added. This mixture is polymerized by heating in an electric oven for forty-eight hours at 70 degrees C. The polymerization product is a low viscosity oil.

A cyclopentylmethallyldialkoxysilane (24.2 grams of cyclopentylmethallyldiethoxysilane) and a dialkyl fumarate (17.2 grams of diethyl fumarate) are mixed and benzoyl peroxide (0.41 gram) is added. This mixture is polymerized by heating in an electric oven for 60 hours at 70 degrees C. The polymerized product is a viscous liquid.

A cyclohexylmethallyldialkoxysilane (25.6 grams of cyclohexylmethallyldiethoxysilane) and a dialkyl fumarate (17.2 grams of diethyl fumarate) are mixed and benzoyl peroxide (0.43 gram) is added. This mixture is polymerized by heating in an electric oven for 60 hours at 70 degrees C. The polymerization product is a viscous liquid. Benzoyl peroxide (0.86 gram) is added to this polymerization product, and the liquid is then placed in the electric oven for 65 additional hours; no apparent increase in viscosity occurs.

A 4-tertiary-amylcyclohexylmethallyldialkoxysilane (32.6 grams of 4-tertiary-amylcyclohexylmethallyldiethoxysilane) and a dialkyl fumarate (17.2 grams of diethyl fumarate) are mixed and benzoyl peroxide (0.50 gram) is added. This mixture is polymerized by heating in an electric oven for 60 hours at 70 degrees C. The polymerization product is a viscous liquid.

Other silicon-containing addition polymers are produced by similar procedures, using any silane having the general formula

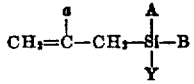

hereinbefore defined.

In producing resins of the invention by the preferred method, the silicon-containing addition polymer that is one of the starting materials is hydrolyzed so that OH radicals are considered to be substituted for the hydrolyzable radicals attached to silicon atoms. Condensation of the hydrolyzed product (formation of

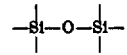

linkages) occurs at least to a slight extent. It is not necessary to isolate the hydrolysis products of the silicon-containing addition polymers and then react them with the alcoholic OH groups of the polyhydric alcohol or the alkyd to produce resins of the invention. In fact, resins of the invention can be produced by an ester-interchange reaction which does not include the step of hydrolyzing the silicon-containing addition polymer. The ester-interchange reaction which occurs between a hydrolyzable group of the addition polymer and an OH group of the alkyd or alkyd constituents is believed to involve the formation of a

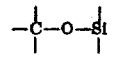

bond, the organic hydrolyzable radical being released to form an alcohol, an aliphatic acid, a phenol or alkyl-substituted phenol, or an inorganic acid containing a halo group of atomic weight less than 80. Such formation of a

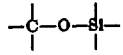

linkage is believed to occur at one of the points at which a hydroxy radical would appear if the silicon-containing addition polymer were hydrolyzed before reaction with the alkyd or alkyd constituents, and this linkage is thought to be the same, whatever the method of preparation of the silicon-containing alkyd resin. Consequently, when the modified alkyd resin of the present invention is defined as an ester of components comprising (1) a polyhydric alcohol, (2) a polycarboxylic acid, and (3) a polymeric substance that is described as having an OH radical attached to silicon, such OH radical merely represents the point at which a

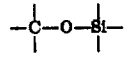

ester linkage occurs in the molecule of the modified alkyd resin. Of course, some condensation of

groups may occur also to form

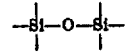

linkages.

The reaction of each hydrolyzable radical of the silicon-containing addition polymer which theoretically occurs during the course of hydrolysis is believed to correspond essentially to Equation 3 (below):

(3) 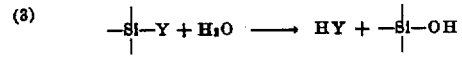

in which Y is a hydrolyzable radical. During or immediately after hydrolysis, the hydrolyzed silicon-containing addition polymer may undergo condensation to produce —Si—O—Si— linkages. However, the large complicated radicals attached to the silicon atom of the silicon-containing addition polymer retard the condensation to

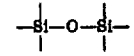

linkages, and, in many instances, a liquid hydrolysis product is isolated after hydrolysis. Only under the action of heat is a liquid product of the hydrolysis of the silicon-containing addition polymer condensed to a hard infusible solid.

The silicon-containing addition polymers are hydrolyzed by adding the polymer to a hydrolyzing solution of an acid at room temperature, with agitation, and allowing the reaction to proceed for a short time. The hydrolysis product is recovered by extraction with a solvent such as an ether and the solution of the extract is dried, e. g., over sodium sulfate. A solvent such as a simple ketone or ester, or one of the lower homologues of benzene (e. g., xylene), is added to the dried solution of the extract, and the extracting solvent may be removed as by heating on a steam bath.

It has been found that the addition of certain solvents to the extraction solution makes it possible to remove the extracting solvent, e. g., diethyl ether, without gelling the hydrolyzed silicon-containing addition polymer. Several of the lower homologues of benzene, such as benzene, toluene, and the xylenes, give satisfactory results.

The hydrolysis reaction may be carried out by simply adding a silicon-containing addition polymer to a hydrolyzing solution of an inorganic acid in water. However, as most of the polymers are insoluble in such a hydrolyzing solution, violent agitation would be required to effect the hydrolysis. It is, therefore, usually preferable to carry out the hydrolysis of the silicon-containing addition polymer in a mutual solvent (i. e., a solvent, such as dioxane, acetone, methyl ethyl ketone, methyl alcohol or ethyl alcohol, which is capable of maintaining a mutual solution of the water, the acid and the polymer).

Any amount of hydrolyzing solution may be used from a slight excess over the minimum which is theoretically required to hydrolyze the polymerized silane (i. e., one molecule of water for every two alkoxy radicals) to the maximum amount which permits a one-phase system to be maintained. The preferred hydrolyzing solution is an aqueous mineral acid solution containing about 10 per cent of mineral acid; the amount of this hydrolyzing solution used is about 50 per cent of the polymerized silane. The amount of solvent used may be any amount from the minimum required to maintain a one-phase system to the maximum amount which is considered economically practicable. The amount of solvent is preferably an amount sufficient to make the volume of the one-phase system about twice the volume of the heteropolymer being hydrolyzed.

Any inorganic acid, such as hydrochloric, sulfuric, or phosphoric, may be used in the hydrolyzing solution, although hydrochloric acid is usually employed. The acid functions as a catalyst for the hydrolysis reaction, and even a trace of acid causes hydrolysis to take place at a rate that is at least appreciable (but not necessarily rapid enough for practical use). The amount of acid used may range from a trace, which gives an appreciable effect, to the amount above which no appreciable increase in effect can be obtained (i. e., about 20 per cent of the polymerized silane). The speed of the hydrolysis reaction is determined essentially by the amount of acid present in the hydrolysis solution, but the preferred amount in a particular instance is determined also by other factors, such as the reactivity of the polymerized silane and the extent of polymerization (e. g., high polymers seem to have a greater tendency than low polymers to gel during hydrolysis).

The hydrolysis reaction usually takes place at ordinary temperatures, and is slightly exothermic. Hydrolysis seems to be complete within a few minutes, but an extended hydrolysis reaction seems to have no harmful effects on the product. Therefore, the time of the hydrolysis reaction seems not to be critical, and it is usually preferable, for economic reasons, to use only a comparatively short hydrolysis reaction (e. g., about five minutes).

All hydrolyzable radicals do not undergo hydrolysis at the same rate, the most readily hydrolyzed being halo radicals. Acyloxy, alkoxy, and aroxy radicals are more difficult to hydrolyze than halo radicals, alkoxy and aroxy radicals being the most difficult to hydrolyze.

Resins of the invention are produced by a reaction between (1) the silicon-containing addition polymer or its hydrolysis products and (2) an alkyd resin or alkyd resin constituents. If the silicon-containing addition polymer is hydrolyzed, it is usually preferable to add an organic solvent solution of the hydrolysis products to the alkyd resin and then to heat in order to effect reaction between the hydrolysis products and the alkyd resin. In some instances, satisfactory results may be obtained if a part of the organic solvent is distilled from the hydrolysis products before admixture with the alkyd resin, but the preferred method avoids the production of resins that yield hazy cured films.

When the products of the hydrolysis of a composition comprising a silicon-containing addition polymer are mixed with an alkyd resin and the resulting mixture is heated, it is believed that the resin mixture is partially condensed, the formation of water being evidence of such condensation. The condensation is thought to yield both

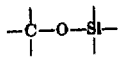

and

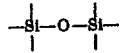

bonds. It usually is desirable to distill the water formed during the heating; it is convenient to accomplish this by effecting the heating under reflux, returning to the resin mixture the material that boils substantially above 100° C. It is frequently advantageous to distill volatile matter other than water during the heating, (when the hydrolysis solvent is diethyl ether the other volatile matter is the diethyl ether, and this is distilled while the resin mixture is being heated to the reflux temperature). However, when the hydrolysis is conducted in a solvent that is to be present in the finished material, e. g., xylene, and no substantial excess of solvent is present (it is usually desirable that there be from about 50 to about 70 per cent solids in the finished resin; preferably, the solids content is from about 55 to about 65 per cent) there is no reason to distill any volatile matter other than the water.

The alkyd resin can be used with the hydrolysis products of the silicon-containing addition polymer directly, i. e., as it is received from the manufacturer, or it can be diluted with a solvent so that the silicon-containing alkyd resin of the invention will have about the desired amount of solvents. Alternatively, an alkyd resin produced specifically for use with hydrolysis products of the silicon-containing addition polymer may be used, or the desired amount of a solvent or solvent mixture may be added to the mixture of alkyd resin and silicon-containing addition polymer hydrolysis products before the mixture is heated.

When resins of the invention are produced by the method that comprises forming a reaction product of a polyhydric alcohol, a polycarboxylic acid and a silicon-containing addition polymer having a hydrolyzable radical attached to a silicon atom, the reaction can be conducted either by mixing the hydrolyzable silicon-containing addition polymer with an alkyd resin, usually one that has been modified by reaction with a fatty acid, and heating to effect reaction (the preferred method), or by mixing the hydrolyzable silicon-containing addition polymer with the components of an alkyd resin, usually including a fatty acid, and heating. Alternatively, the components of an alkyd resin may be partially reacted and then added to the hydrolyzable silicon-containing addition polymer; the desired reaction product then is produced by heating. The reaction which occurs between the hydrolyzable radical attached to a silicon atom of the silicon-containing addition polymer and the alkyd or alkyd constituents is believed to involve the formation of a

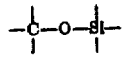

bond, the organic hydrolyzable radical being released to form an alcohol, an aliphatic acid, a phenol or alkyl-substituted phenol, or an inorganic acid containing a halo group of atomic weight less than 80. It is usually preferable to conduct the reaction at such a temperature and under such conditions that the alcohol or acid is distilled from the silicon-containing alkyd resin; so the preferred alkoxy and acyloxy radicals are those giving low boiling alcohols and acids, i. e., those boiling at a temperature not higher than about 150° C. Aroxy radicals are usually less desirable than are the alkoxy an acyloxy radicals; because they boil at comparatively high temperatures, their complete removal from the resin is extremely difficult, if not impossible, and it is well known that they are likely to impart an undesirable color to alkyd resins. Their use is desirable when the finished alkyd resin is modified with a phenolic resin or when color is not of primary importance.

It is usually desirable that an esterification catalyst such as HCl or SiCl₄ be added to the mixture (usually in an amount not less than about 0.1 per cent of the mixture, and, preferably, in an amount not less than about 0.2 per cent; it is ordinarily desirable that such a catalyst be used in an amount not greater than about 0.5 per cent of the mixture, and preferable that it be used in an amount not greater than about 0.4 per cent). Calcium naphthenate can also be used as an esterification catalyst, usually in a somewhat larger amount, e. g., ordinarily not less than about 1 per cent of the mixture, and preferably, not less than about 2 per cent; it is ordinarily desirable that calcium naphthenate be used in an amount not greater than about 5 per cent of the mixture, and preferably that it be used in an amount not greater than about 4 per cent. As is indicated above, it is believed that

groups become

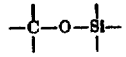

linkages during this heating, and that alkoxy radicals become alcohols, acyloxy radicals become aliphatic acids, aroxy radicals become phenols or alkyl substituted phenols, and halo radicals become inorganic acids. Usually it is desirable to distill the volatile organic material so formed during the heating; it is convenient to accomplish this by effecting the heating under reflux and returning to the resin mixture the material that boils substantially above the boiling temperature of the highest boiling volatile organic material so produced. This may be impractical in the case of certain phenols, because their boiling points are higher than the temperatures at which the reaction is usually conducted. Ordinarily the reaction is conducted under reflux, the liquid temperature being not higher than about 200° C., and, preferably, not higher than about 150° C. The reflux temperature of the reaction mixture is usually not lower than about 100° C. In many instances, particularly when the fatty acid is one whose molecule comprises ethylenic double bonds or when the hydrolyzable silicon-containing addition polymer is reacted with the components of an alkyd resin, it is advantageous to conduct the reaction in an atmosphere of an inert gas such as nitrogen or carbon dioxide. A solvent can be added to the mixture of alkyd resin and silicon-containing addition polymer before the reaction is initiated, e. g., one of the solvents hereinbefore named in which commercial alkyd resins are generally available. The amount of such solvent that is added can be varied within wide limits, e. g., so that the volume of solvent in the mixture is as little as about ½ the volume of the mixture or as much as about ¾ the volume of the mixture, and it is usually not necessary to add any such solvent when a commercial alkyd resin is used. The desired amount of such a solvent may be added after the reaction. On the other hand, an excess of solvent may be added to the reactants, and this excess distilled, e. g., through the reflux condenser, along with the alcohol, acid or phenol. The solvents that are ordinarily used are more volatile than are the phenols which result from the reaction; as a consequence, they are distilled with these phenols, and, when the hydrolyzable silicon-containing addition polymer has aroxy radicals as the hydrolyzable groups, it is desirable to add solvent as the reaction proceeds to replace that distilled, so that the resin does not become too viscous.

Example 1

A silicon-containing alkyd resin is produced by a method that comprises forming a reaction product of a polyhydric alcohol, a polycarboxylic acid and a hydrolyzed silicon-containing addition polymer according to the following procedure:

A methallyltrialkoxysilane (218 grams of methallyltriethoxysilane) is mixed with a dialkyl fumarate (172 grams of diethylfumarate) in a 500 ml. flask and benzoyl peroxide (3.9 grams) is added. The flask is stoppered and the mixture is polymerized by heating in an oven for 70 hours at a temperature of about 70 degrees C. The flask is removed from the oven at the end of this time. The polymerized product, which is a viscous glycerine-like liquid, is then poured into a one liter Claisen flask, and (using a water aspirator to maintain a pressure of about 12 mm. Hg) the low boiling material is distilled from the mixture until the pot temperature reaches about 170 degrees C. The material distilled weighs ninety-five grams, and the very viscous residue is the silicon-containing addition polymer.

A sample (100 ml.) of the silicon-containing addition polymer prepared as described in the preceding paragraph is hydrolyzed by pouring slowly (over a period of about 5 minutes) into 100 ml. of a stirred hydrolyzing solution (50 ml. of ethanol and 50 ml. of an approximately 15 per cent aqueous solution of HCl). The resulting mixture is stirred for 5 to 10 minutes; diethyl ether (300 ml.) is added; and the stirring is continued for ten additional minutes. This mixture is poured into water (250–300 ml.) in a separatory funnel, and the ether layer is separated from the water layer. The water layer is re-extracted with diethyl ether (100 ml.); the ether layer is separated from the water layer and added to the first ether extract; and the combined ether layers are washed twice with water (about 100 cc. portions). The ether solution is then dried over about 25 grams of anhydrous sodium sulfate for one hour. The sodium sulfate is removed by filtration; the filtrate is added to an evaporating dish; and the ether solution is distilled until the volume of remaining resin is about 100 ml. Xylene (70 ml.) is then added and the last of the ether evaporated, leaving a xylene solution of the hydrolyzed heteropolymer that is about 50 per cent solids. A sample (20 grams) of the xylene solution of the hydrolyzed silicon-containing addition polymer is mixed with an alkyd resin (20 grams of a short oil length soya modified glycerol phthalate alkyd resin, diluted to 55 per cent solids with xylene, prepared by the procedure hereinbefore described, using 3.32 mols of glycerol, 2.22 mols of soya fatty acid and 3.08 mols of phthalic anhydride; the ingredients are reacted to an acid number of about 8.2, and the phthalic acid content of the finished resin is about 43 per cent; the oil length about 38 per cent) to give a clear solution. A film from this mixture is made on a glass plate and baked in an oven for one hour at about 150 degrees C. The film cures to a hard, flexible condition.

Another sample (20 grams) of the xylene solution of the hydrolysis products of the hydrolyzed silicon-containing addition polymer prepared as described in this example is mixed with an alkyd resin (30 grams of the alkyd solution prepared as described in the preceding paragraph). The mixture is refluxed for 1½ hours and water is removed in a Stark and Dean trap. Heating is discontinued and butanol (5 ml.) and methylethyl ketone (5 ml.) are added. The resin is filtered to remove small gelled particles. A sample of the filtrate is filmed on a glass plate and baked for one hour at about 150° C. A hard, tough film results.

The procedure described in the preceding paragraph is repeated, limiting, however, the time for refluxing the mixture to one hour. A film of this material cures in one hour to a hard, tough, clear condition, the cured film being superior in color to one prepared according to the preceding paragraph.

Example 2

A sample (90 grams) of the silicon-containing addition polymer prepared as described in Example 1 is hydrolyzed by a procedure similar to that described in the third paragraph of Example 1, except that after drying the combined ether extracts over about 25 grams of anhydrous sodium sulfate for one hour, the solution is filtered into a 1 liter Claisen flask. Xylene (56 grams) is added and the resulting solution is mixed with an alkyd resin (91 grams of a short oil length coconut oil modified glycerol phthalate alkyd resin, diluted to 60 per cent solids with xylene, prepared by the procedure hereinbefore described, using 6.38 mols of glycerol, 2.92 mols of coconut fatty acid and 5.40 mols of phthalic anhydride; the ingredients are reacted to an acid number of about 2.2, and the phthalic acid content of the finished resin is about 43 weight per cent; the oil length about 34 per cent). Ether is then distilled until the liquid temperature is about 125° C. The mixture is transferred to a 1 liter flask fitted with a Stark and Dean trap equipped with a reflux condenser. The mixture is refluxed for 1¼ hours during which time the water is removed but not the xylene. A sample of the resin is filmed on a glass plate and baked in an oven for one hour at about 200° C. A clear, hard, flexible almost colorless film results. This resin is incompatible with Varnolene, and, after standing for several weeks, the xylene solution gels. The gel is soluble in methylethyl ketone, and this solution gives good, clear, almost colorless, hard films.

*Example 3*

A silicon-containing alkyd resin is produced by a method that comprises forming a reaction product of a polyhydric alcohol, a polycarboxylic acid and a silicon-containing addition polymer having at least one hydrolyzable radical attached to the silicon atom, by an esterification or transesterification according to the following procedure:

A sample (50 grams) of the silicon-containing addition polymer prepared by the method described in the second paragraph of Example 1, an alkyd resin (50 grams of a medium oil length soya modified glycerol phthalate alkyd resin, diluted to 50 per cent solids in xylene, prepared by the procedure hereinbefore described; the ingredients are reacted to an acid number less than 4; the phthalic acid content of the finished resin is about 39 per cent and the oil length is about 42 per cent), xylene (100 grams), and calcium naphthenate (0.5 grams) are mixed and heated under reflux at a temperature of about 150° C. for one hour. As the mixture then shows signs of incipient gelation, heating is discontinued. A sample of the resin is baked on a glass plate in an oven for ½ hour at about 150° C. A very hard, flexible film is obtained.

The procedures hereinbefore described may be employed to produce other silicon-containing alkyd resins using, as starting materials, any silicon-containing addition polymer hereinbefore described.

In the preparation of resins of the invention the silicon-containing addition polymer can be any of those hereinbefore described, and the amount of silicon-containing addition polymer hydrolysis products (or the amount of hydrolyzable silicon-containing addition polymer) that is reacted with the alkyd resin can be varied within wide limits. It is usually desirable that in a finished modified alkyd resin of the invention the weight ratio of condensed hydrolysis products (or hydrolyzable silicon-containing addition polymer) to alkyd resin be at least about 1:9, and preferable that it be at least about 1:4. It is usually desirable that the weight ratio of condensed hydrolysis products (or hydrolyzable silicon-containing addition polymer) to alkyd resin be not greater than about 9:1 and preferable that it be not greater than about 4:1. A resin having too low a ratio of condensed hydrolysis products (or hydrolyzable silicon-containing addition polymer) to alkyd resin is not sufficiently improved to justify the expense of modification, while a resin having too high a ratio may lack homogeneity, or be unreasonably expensive.

The resins of this invention show improvement over previously known silicon-containing alkyd resins in that they not only have better color, but are also simultaneously very hard and very tough.

Having described the invention, we claim:

1. A modified polyhydric alcohol-polycarboxylic acid resin, wherein some of the alcoholic hydroxy radicals of the polyhydric alcohol are replaced by groups each of which consists of an oxygen atom forming a linkage between the polyhydric alcohol reside and a silicon atom in an organosilicon radical comprising, as units linked through polymerized olefinic double bonds, (a) a unit of the class consisting of maleic anhydride and neutral esters of butenedioic acids in which each of the alcohol radicals is of the class consisting of 1-chloro-2-propyl, 2-chloro-ethyl, benzyl, tetrahydrofurfuryl, cyclohexyl, phenyl, cresyl, and primary and secondary alkyl radicals having from one to eight carbon atoms, and (b) a unit having the general formula

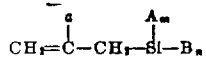

wherein $a$ is of the class consisting of hydrogen and methyl; each of the subscripts $m$ and $n$ is a number from zero to 1; B is of the class consisting of benzyl, primary and secondary alkyl radicals having from one to twelve carbon atoms, monovalent aromatic hydrocarbon radicals having a single nucleus to which the free valence is attached, having from six to twenty-one carbon atoms, and having not more than three side chains consisting of alkyl radicals of not more than five carbon atoms, and monovalent cycloaliphatic hydrocarbon radicals having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms; and A is of the class consisting of monovalent aromatic hydrocarbon radicals having the free valence attached to a nucleus, having ten nuclear carbon atoms, having a total of ten to twenty-five carbon atoms, and having not more than three side chains consisting of alkyl radicals of not more than five carbon atoms, and radicals of the same class as B; and the remaining valences of the silicon atom are connected to oxygen linkages.

2. A modified polyhydric alcohol-polycarboxylic acid resin as claimed in claim 1 wherein the first-mentioned unit is a neutral alkyl ester of a butenedioic acid in which each alkyl radical has from one to eight carbon atoms and has at least one hydrogen atom attached to the same carbon atom as the ester linkage.

3. A modified polyhydric alcohol-polycarboxylic acid resin as claimed in claim 2 wherein $n$ is zero.

4. A modified polyhydric alcohol-polycarboxylic acid resin as claimed in claim 3 wherein $m$ is zero.

5. A modified polyhydric alcohol-polycarboxylic acid resin as claimed in claim 1 wherein $n$ is zero.

6. A modified polyhydric alcohol-polycarboxylic acid resin as claimed in claim 5 wherein $m$ is zero.

7. A modified polyhydric alcohol-polycarboxylic acid resin as claimed in claim 6 wherein the first-mentioned unit is diethyl maleate and $a$ is hydrogen.

8. A modified polyhydric alcohol-polycarboxylic acid resin as claimed in claim 1 wherein the first-mentioned unit is diethyl maleate; $a$ is methyl; and each of the subscripts $m$ and $n$ is zero.

9. A modified polyhydric alcohol-polycarboxylic acid resin as claimed in claim 1 wherein the first-mentioned unit is diethyl fumarate; $a$ is hydrogen; and each of the subscripts $m$ and $n$ is zero.

10. A modified polyhydric alcohol-polycarboxylic acid resin as claimed in claim 1 wherein the first-mentioned unit is diethyl fumarate; $a$ is methyl; and each of the subscripts $m$ and $n$ is zero.

DAVID B. HATCHER.
RAYMOND H. BUNNELL.

REFERENCES CITED

The following references are of record in the file of this patent:

UNITED STATES PATENTS

| Number | Name | Date |
| --- | --- | --- |
| 2,443,740 | Kropa | June 22, 1948 |
| 2,465,731 | Kropa | Mar. 29, 1949 |

FOREIGN PATENTS

| Number | Country | Date |
| --- | --- | --- |
| 583,754 | Great Britain | Dec. 30, 1946 |

Certificate of Correction

Patent No. 2,624,720                                                                 January 6, 1953

DAVID B. HATCHER ET AL.

It is hereby certified that error appears in the printed specification of the above numbered patent requiring correction as follows:

Column 2, line 53, for "alkyd" read *alkyl*; column 7, line 69, for "-propanal" read *-propanol*; column 11, line 68, after "filter" insert *cake*; column 26, line 4, for "reside" read *residue*;

and that the said Letters Patent should be read as corrected above, so that the same may conform to the record of the case in the Patent Office.

Signed and sealed this 30th day of June, A. D. 1953.

[SEAL]

THOMAS F. MURPHY,
*Assistant Commissioner of Patents.*